United States Patent [19]

Trimm et al.

[11] Patent Number: 5,476,528
[45] Date of Patent: Dec. 19, 1995

[54] SYSTEM FOR IMPROVING MATERIAL RELEASE PROFILES

[75] Inventors: Joe R. Trimm, Killen; James R. Burnell, Sheffield, both of Ala.

[73] Assignee: Tennessee Valley Authority, Muscle Shoals, Ala.

[21] Appl. No.: 169,110

[22] Filed: Dec. 20, 1993

[51] Int. Cl.⁶ .................... C05F 3/00; C05C 9/00; C05G 5/00

[52] U.S. Cl. ............ 71/21; 71/28; 71/29; 71/30; 71/64.07; 71/64.11

[58] Field of Search ............... 71/64.07, 64.11, 71/28–30, 13, 15, 21

[56] References Cited

U.S. PATENT DOCUMENTS

4,299,613  11/1981  Cardarelli ............... 71/64.07
4,857,098   8/1989  Shirley, Jr. .............. 71/64.07

Primary Examiner—Ferris Lander
Attorney, Agent, or Firm—Robert A. Petrusek

[57] ABSTRACT

Improved release profiles which can, for the first time, be customized to match requirements of systems including crop nutrient uptake are realized by providing a plurality of heterogeneous particles comprised of water-soluble constituents set in a matrix of water-insoluble materials, and further providing a continuous homogeneous barrier of same, or a different water-insoluble material, juxtaposed the peripheral surface of each such heterogeneous particle. A first alternate embodiment includes forming in situ reaction products to reduce the specific gravity of such heterogeneous particles. In a second alternate embodiment, there is substituted for all, or a portion of such water-soluble material, organic media comprised primarily of composted poultry litter wherein soluble iron values remain available for substantial periods of time without incorporating or utilizing expensive conventional synthetic chelating agents.

8 Claims, 7 Drawing Sheets

SYSTEM FOR IMPROVING MATERIAL RELEASE PROFILES

The invention herein described may be manufactured and used by or for the Government for governmental purposes without the payment to us of any royalty therefor.

INTRODUCTION

The present invention relates to the utilization of certain waste or by-product materials in the development of a new, novel, inexpensive and highly reproducible method, process, technique and/or system for the production of materials having improved release profiles, including an improved method and system for the production of fertilizers having controlled, predetermined, and programmable nutrient release characteristics.

It has long been known how to produce fertilizers with some degree of delayed or controlled release for the nutrient values incorporated therein, particularly when such values represent water-soluble fertilizers of a hygroscopic nature. The most common method of delaying or controlling the nutrient release rate for soluble fertilizers is to coat each fertilizer granule with some form of water-insoluble material. However, such fertilizer coatings have proven to be unpredictable with respect to their release rate and/or have been expensive to produce.

It has long been deemed highly desirable to provide fertilizer products with preprogrammable and variable nutrient release rates in order to supply nutrients in an available form such that they can effectively and efficiently be utilized by the plant(s) at the situs wherein application of such products is effected. For example, turf grown in temperate climates requires a constant release of nutrients, particularly nitrogen, throughout the entire growing season, whereas field or garden crops require a relatively slower release rate of nutrients during the early stages of development and a relatively higher rate of release of nutrients during rapid growth periods, including the fruiting stage. Such nutrient release rates or profiles may now be easily achieved in a relatively inexpensive manner by practice of the process, or utilization of the system of the present invention.

In the first principal embodiment of the present invention, a water-soluble nutrient, specifically urea, is dispersed in a matrix formulation comprising various waxes and polyolefins derived primarily from waste sources. The resulting matrix fertilizer is then formed into the desired shape and size of "particles" by any of the various means of agglomeration such as extrusion, compaction, granulation, or pelletization. In this first principal most preferred embodiment of the instant invention, an additional coating of wax, polymer, or other insoluble or slightly soluble material is applied in the needed amount to achieve the desired nutrient release profile for the fertilizer particles.

The use of waste materials in the practice of the instant process serves two purposes. First, the use of these materials enables the manufacture of products at a cost compatible with currently available conventional fertilizers. Secondly, and probably far more importantly, is the provision for environmentally safe disposition of wastes. For example, the polyethylene used in the instant process is a waste material derived from the reclamation of copper or aluminum electrical wire. In the process of separating the metal from the polyethylene coating, a small amount of metal is left in the polyethylene. This amount of metal, although relatively small, prohibits the recycling of this contamination coating material through conventional means. However, in the production of fertilizers, this copper can serve as a source of an important micronutrient while the aluminum is innocuous, i.e., as more of the congeneric $R_2O_3$ type impurity present in many fertilizers currently produced.

Practice of the second principal embodiment of the instant invention involves the use of a blowing or expanding agent which effectively reduces the density of the product sufficiently to allow for flotation thereof. This embodiment of the instant invention is eminently useful for the production of a nutrient supply which can be applied to oil spills to thereby supply nutrients utilized in the biological degradation thereof. A nutrient supply (fertilizer) for this purpose must possess a programmable release rate for the nutrient values, be applicable to a variety of different nutrients, and be capable of floating indefinitely on oil-contaminated water. All of these properties are readily incorporated into products produced by this second principal embodiment of the instant invention.

Practice of a third principal embodiment of the instant invention involves the use of poultry litter/iron source in place of, or as a substitute for currently used and relatively costly synthetic organic iron chelating compounds. Although studies have shown that poultry litter can be utilized as a good, environmentally safe fertilizer and soil conditioner when used in proper amounts, the concentrated application of this material near poultry growing centers has led to contamination, with nitrates, of ground and surface water. It has now been unexpectedly found that poultry litter may be used in the production of an iron source fertilizer which can result in the safe disposition of some of this poultry-waste material as well as environmentally safe utilization of its fertilizer ingredients. Also, the iron used therein can be derived from waste by-products such as salts from the galvanizing industry, which unexpectedly combine with the litter to produce an iron source which is very slowly released over relatively long periods of time.

BACKGROUND OF THE INVENTION

1. Field of the Invention.

The present invention relates to a unique method of controlling the release profile of materials containing water-soluble components, which has the added advantage of utilizing substantial amounts of waste materials normally having high disposal costs and unfavorable environmental impact. The instant system and process can include production of an agglomerated soluble fertilizer nutrient dispersed in a wax-polymer matrix, which is then coated with an additional wax-polymer film to thereby release the encapsulated nutrient in a predetermined manner. The nutrients which can be used in this type of release mechanism comprise a plethora of water-soluble compounds, primarily those containing nitrogen. Waste disposition situations which would be addressed include, but are not limited to, polyethylene from wire reclamation, wax from investment casting, iron and zinc salts from galvanizing and steel production, and animal litter resulting from feed lot operations and more specifically litter resulting from operation of poultry houses. As used herein, chicken litter, poultry litter or litter means a waste material derived from poultry (chicken) broiler production. It comprises approximately 25 percent chicken feces and 75 percent wood shavings or sawdust. The material is "composted" by wetting and placing in mounds, then aerated periodically to encourage biological activity, with such wetting and aeration being continued until all apparent biological activity has ceased.

An increase in groundwater contamination in many populated areas of the world necessitates more efficient use of nitrogen fertilizers. One means of accomplishing this desired objective would be to produce fertilizers which release their nutrients according to predetermined release rate profiles. Accordingly, as the nutrient is released by a particular fertilizer it would become available for uptake and consumption by the crop for which the fertilizer was specifically designed. The net result would be more nitrogen available to the plant for its use and less "free" nitrogen available for undesirable leaching from the root zone of the soil situs. Slow release fertilizers currently available all offer the same or similar linear release profiles (percent of total nutrient released vs time). Although these fertilizers are adequate for some needs such as turf, they do not offer the release properties needed for major agricultural crops. The present invention offers the capability of manufacturing a fertilizer whose release profile could be predetermined by various matrix/coating combinations, thereby effectively changing or altering not just the slope of a resulting time/release curve but also the shape (order) thereof.

2. Description of the Prior Art

In 1965, a new combination comprising urea, a coating of sulfur (SCU), and a sealant of paraffin oil and polyethylene was reported by Blouin (U.S. Pat. No. 3,295,950, Jan. 3, 1967) which effectively delayed the release of the nitrogen nutrient contained therein. Subsequent patents by Blouin (U.S. Pat. No. 3,342,577, Sept. 19, 1967), Shirley (U.S. Pat. No. 3,903,333, Sept. 2, 1975), and Gullet (U.S. Pat. No. 4,676,821, Jun. 30, 1987) describe improvements or modifications of this process. U.S. Pat. Nos. 3,014,783, Young, Dec. 26, 1961; 3,458,303, Belak, Jul. 29, 1969; 3,400,011, Fox, Sep. 3, 1968; and U.S. Pat. No. 3,314,778, Fox, Apr. 18, 1967, all describe processes or materials for the coating of soluble fertilizer nutrients to delay or control the nutrient release. Hofacker (U.S. Pat. No. 4,002,458, Jan. 11, 1977) teaches the encapsulation of aqueous fertilizer solutions in a wax-polyethylene-hydrocarbon shell. More recently, Chisso-Asahi Fertilizer Co., Ltd. of Japan introduced a series of products coated with polyolefin resins.

From the teachings above, as well as other disclosures in the prior art, it should be appreciated that although coated fertilizer materials as presently produced are effective for some fertilization application needs, they are fraught with a plethora of difficulties and are of limited usefulness due to the following three factors:

1. Since the only barrier to dissolution is the thin coating on the soluble fertilizer, improperly formed coatings or damage to such coatings during manufacture, shipping, or application can result in a "dumping" of a portion of the nutrient. "Dumping" is the immediate release of fertilizer nutrients upon application. Unless the "dumping" of the nutrient is excessive there is usually no harm to crops, but the fertilizer user ends up paying premium rates for that portion of this material which functions like any common water-soluble fertilizer.

2. All mass-produced and currently available coated fertilizer materials, along with a great variety of other water-soluble materials, have a linear release profile (time vs percent of total nutrient released). The release rate is greatest immediately after application and decreases with time. Although this release profile is acceptable for some crops such as turf grass, it is inadequate for most major crops which require small amounts of fertilizer during early growth and large amounts of fertilizer nutrients to be available during periods of rapid plant growth or fruiting.

3. High production costs for most coated fertilizers prohibit their use on major food crops. For instance, the increased cost for applying coatings onto many fertilizer materials can easily range from 300 percent for SCU to as much as 1,000 percent for some polymer-coated material.

The dispersion of soluble nutrients in a hydrophobic matrix has been the subject of study by several researchers including, Hess (U.S. Pat. No. 3,285,733, Nov. 15, 1966), Sommer (U.S. Pat. No. 3,748,115, Jul. 24, 1973), Campbell (U.S. Pat. Nos. 3,290,139, Dec. 6, 1966; U.S. Pat. No. 3,331,677, Jul. 18, 1967; U.S. Pat. No. 3,314,778, Apr. 18, 1967; and U.S. Pat. No. 3,306,728, Feb. 18, 1967), and Malmberg (U.S. Pat. No. 3,306,730, Feb. 28, 1967). More particularly, Hollstein (U.S. Pat. No. 3,300,294, Jan. 24, 1967) and Bozzelli (U.S. Pat. No. 3,300,293, Jan. 24, 1967) teach methods wherein may be produced a variety of fertilizers which are dispersed in petroleum waxes, either with or without additives. Only the teachings of Hollstein supra, are concerned with the use of waxes in combination with polymeric material. More particularly, Hollstein appears to be concerned only with teachings which utilize polymeric materials to thereby allow for formation of wax-urea adducts. It has now been determined that of the fertilizers dispersed in wax-additives, only the wax-polymer formulations, in combination with the wax-urea adduct formation, deter nutrient release enough to be of any practical value for use with most crops. Although Cardarelli (U.S. Pat. No. 4,299,613, Nov. 10, 1981) teaches the use of polymer for his matrix component, his teachings appear to be directed only to the encapsulation of micronutrients and, unfortunately, address neither macronutrient supply nor nonlinear release rates of the type herein proposed.

In view of the prior art teaching supra, and the teaching of the instant new invention as herein discussed infra, it should be appreciated by those skilled in this art that the problems and limitations associated with the direct coating of water-soluble nutrients are now overcome by the practice of the instant invention in which a wax-polymeric coating is applied to particulate fertilizer material which has previously been dispersed in a wax-polymeric matrix rather than being applied to the surface of each particle of the water-soluble nutrient.

SUMMARY OF THE INVENTION

The instant invention relates to the use of waste materials in development of a new, novel, inexpensive as well as highly reproducible system and method therefor whereby fertilizers, particularly soluble nitrogen fertilizers, with easily controlled and preprogrammable nutrient release profiles may be produced. The present invention, as will be apparent from a reading of the description infra, employs a method by which soluble fertilizer nutrients are first dispersed in a wax-polymer matrix and then subsequently coated with additional polymer or a wax-polymer mixture to yield a fertilizer product with a programmed release rate for the soluble nutrients contained therein. In the practice of the instant invention, particles of fertilizer such as urea, preferably less than about 0.05 inches in diameter but greater than about 0.01 inches in diameter, are mixed with a specially selected blend of wax-polymer which has previously been heated above the softening point of the wax-polymer mixture. The resulting mix of fertilizer particles dispersed in the polymer, in heterogeneous form, is then formed into discrete fertilizer pellets of the desired size by any of a number of convenient means such as by extrusion, pelletizing, compacting, or granulation. The resulting product, when cooled, is a controlled release fertilizer still having a linear release profile of the type of the prior art. According to the practice of the instant invention, granules, pellets, or other discrete particles comprising this heterogeneous material are then overcoated with an additional wax, polymer or wax-polymer coating which may either be the same as the matrix formulation or a different material, to thereby produce the desired material having a substantially slow release rate for a predetermined, initial period of time. This additional overcoating, which is in the form of a homogeneous layer, may be applied by any of a number of techniques familiar to those experienced in the art such as hot melt spraying or dipping, hot bed coating by tumbling, or spray application of a solution or emulsion of the coating material. The selection of the wax-polymer blend for the matrix and for the coating as well as the ratio of the wax-polymer to the soluble fertilizer all contribute to a definite and predictable release profile for the fertilizer product.

It now has been found that in the practice of the instant invention, the best source for a soluble nitrogen fertilizer is urea, primarily due to its relatively low cost and high nitrogen (46.6%) content. For the matrix material (the material in which the soluble fertilizer is dispersed) a mixture of polyethylene and petroleum wax (paraffin wax, slack wax, or microcrystalline wax) is preferred. It has also now been found that, as feedstock for the matrix material, practically all sources of polyethylene and waxes (currently available as waste or by-product materials) can be used if the proper blend of wax/polymer is first selected. Optionally, additional diluents, modifiers, plasticizers, or coloring materials may be added. For the overcoating material, blends of petroleum wax, polyethylene, hydrocarbon resin, and/or polypropylene may be applied by hot bed coating; hot melt spraying or dipping and spraying of solutions or emulsions of polyethylene, polypropylene, polyester, polystyrene, polyvinyl, polyurethane and/or hydrocarbon resin.

The above procedures can be utilized and modified to provide practice of the second principal embodiment of the instant process, wherein a certain material, specifically ammonium carbonate, having desired "blowing" characteristics is added to the heterogeneous mix during formulation to thereby cause expansion of the final product. In addition, urea phosphate is added during formulation as a means of capturing released ammonia. During processing, the ammonium carbonate decomposes to ammonia and carbon dioxide. The ammonia so generated, in situ, immediately reacts with the urea phosphate which prevents its release, whereas the gaseous carbon dioxide, also generated in situ, is released into the product to cause expansion (blowing) thereof. The degree of such expansion can be controlled to allow for the product to float on a liquid such as oil or water.

In the practice of a third principal embodiment of the instant process, poultry litter, specifically composted chicken litter, is incorporated as one of the principal ingredients in the product together with an iron source such as ferrous sulfate. It has now been discovered that the incorporation of composted chicken litter and waste ferrous sulfate into the wax/polymer matrix results in delaying the dissolution of the iron for an unexpectedly long time as well as maintaining the iron in the more desirable ferrous state. Under the conditions of pellet formation, the ferrous sulfate (either pure or waste) is melted and/or dissolved and forced into the granules of chicken litter where it presumably reacts with ingredients in the litter, probably protein, to form a slowly soluble iron compound. This reduced solubility, in conjunction with the added protection of the wax/polymer matrix, results in a release of ferrous iron over a long and controlled time period.

OBJECTS OF THE INVENTION

It is therefore a principal object of the present invention to develop a new methods and/or means for easily, efficiently, and economically preparing fertilizers having controlled release profiles for the nutrient values therein, while utilizing predominately waste materials for the release controlling mechanism.

A second object of the present invention is to prepare a nutrient supply material which floats on oil-contaminated water and exhibits preprogrammable release rate profiles for the nutrients contained therein.

Another object of the present invention is to develop a system, as well as techniques for the execution thereof, whereby a fertilizer prepared according to the principal object supra, and to which certain other nutrients such as waste iron or zinc may be incorporated or blended without creating problems with the storage or application of the resulting material, and at the same time provide a product which will release contained nutrients at a predetermined rate and in the desirable form.

Still another object of the present invention is to produce a fertilizer whose release profile is determined in the manufacture of that product. By being able to produce fertilizers with programmable release profiles, specific crops can be supplied with the desired nutrients when they are needed most. For example, a fertilizer having a release rate profile with a delay of 30 to 45 days before any significant amount of nutrient release to the soil situs and thereafter followed by continuous release for a period of about 60 days, would be ideally suited for mechanized rice cultivation.

Still further and more general objects and advantages of the present invention will appear from the more detailed description set forth below, it being understood, however, that this more detailed description is given by way of illustration and explanation only and not necessarily by way of limitation since various changes therein may be made by those skilled in the art without departing from the true spirit and scope of the present invention.

BRIEF DESCRIPTION OF THE DRAWINGS

The present invention will be better understood from a consideration of the following description taken in connection with the accompanying drawings in which:

For the sake of convenience and ease of understanding, FIGS. 2, 3, 4, 5, 6, and 7 are discussed in greater detail in the discussions of Examples I, II, III, and IV, infra.

DETAILED DESCRIPTION OF THE DRAWINGS

As noted above, FIGS. 2, 3, 4, 5, 6, and 7 are discussed in greater detail in conjunction with the discussions of Examples I, II, III, and IV, infra. Accordingly, the detailed description below is directed only to FIG. 1.

Figure 1:
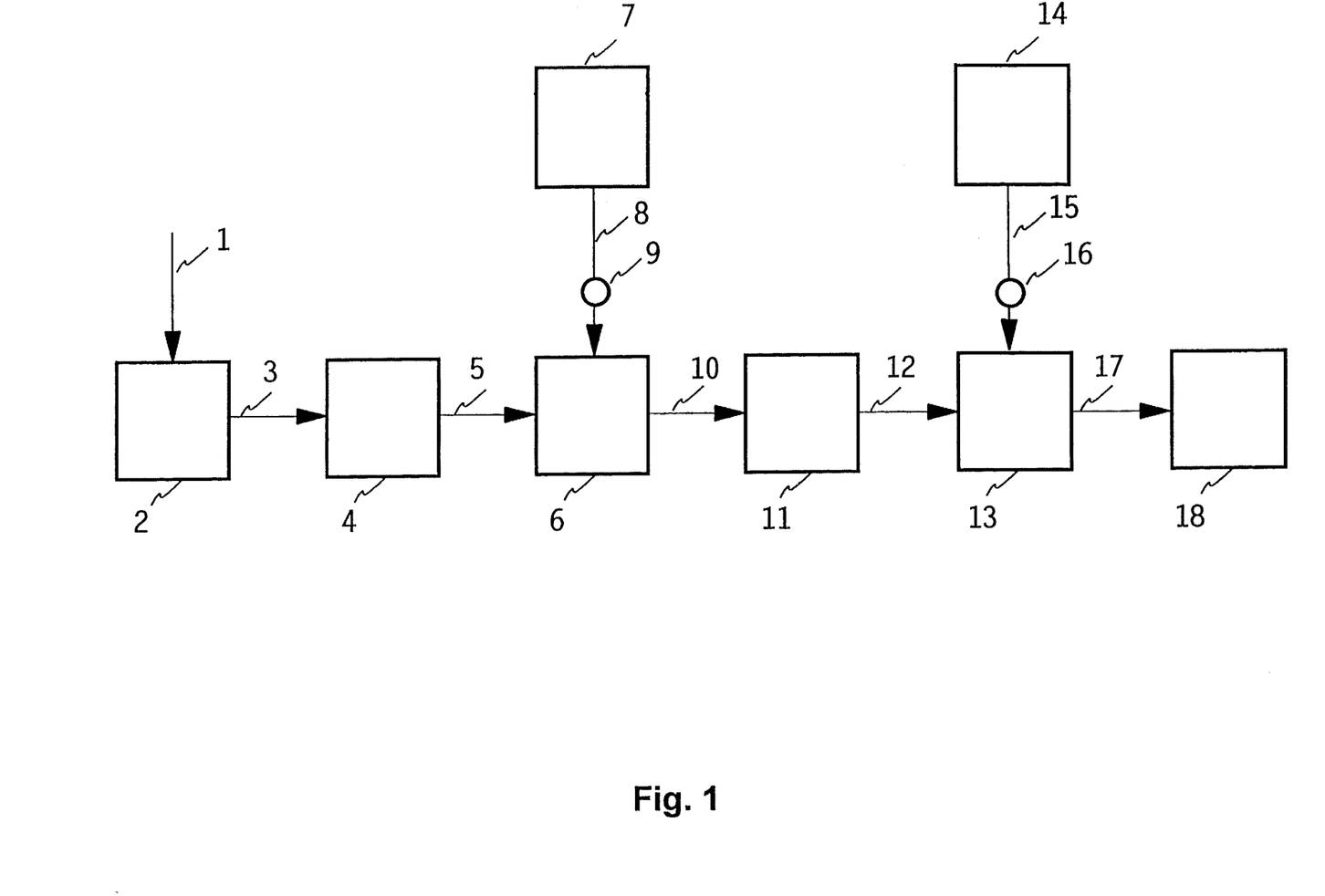
FIG. 1 is a flowsheet of the first preferred embodiment generally illustrating the principles of this part of the instant invention.

Referring now specifically to FIG. 1, a preferred method for practice of the first embodiment of the instant invention may be effected as follows: solid urea, from a source not shown, is fed via line 1 to distribution or translocation means, herein conveniently referenced as hopper 2, wherefrom predetermined amounts, at predetermined rates of delivery, can be metered via line 3 to crusher 4 wherein the particle size of the material delivered to hopper 2, in this embodiment normally a nitrogen containing fertilizer material preferably urea, is reduced to the desired limits described supra. The resulting crushed urea is removed from crusher 4 and fed via line 5 to mixing device 6 wherein it is combined with a molten wax-polymer mix which, as illustrated, is retrieved from storage tank 7 via line 8 and means for control of flow 9. The materials fed via lines 5 and 8 to mixing device 6 are subjected to mixing in device 6 and heated until the resulting mix is softened sufficiently to be formed into pellets as, for instance, a mix of solid urea and softened polymer. Such a mix is fed via line 10 to pelletization means 11 which may be, for example, a pellet mill, a granulation drum, or an extruder. The resulting formed fertilizer pellets or particles are removed from pelletization means 11 via line 12 and introduced into rotating drum granulator 13 wherein they are cooled and sprayed with an additional polymer mix via a sprayer (not shown) located in granulator 13, with said polymer mix retrieved from vessel 14 via line 15 and means for control of flow 16. Drum 13 may conveniently be tilted at an angle (not shown) which causes the material to flow through drum 13 during cooling and spraying. The resulting product is removed from drum 13 via line 17 and transported to storage means 18. If desired, solid conditioners (not shown) may be added to the final product to further enhance its storage characteristics, including no caking of the material.

Referring again to FIG. 1, for practice of the second embodiment of the instant invention, essentially the same procedure and equipment is used as in the practice of embodiment 1, as described just above; however, provisions need to be made for incorporating or introducing the blowing agent, either prior to, simultaneous with, or subsequent to introduction of urea to hopper 2. Accordingly, it may be appreciated that the blowing agent, including the preferred material ammonium carbonate, may be introduced from a source not shown via line 1, together with the urea, supra, or it may be introduced by juncture with line 3, not shown, for direct introduction into crusher 4. In those instances wherein the nitrogen supply material comprises only urea and amounts of phosphate material such as, for example, in the form of ammonium phosphate, urea phosphate, or mixtures thereof need to be added to react with the blowing agent, such amendments may likewise be made either via line 1 or line 3.

For the practice of this second embodiment, the addition of ammonium carbonate as a blowing agent is always necessary, but the selection of nutrients is variable depending on the targeted use of the finished product. For example, a typical nutrient blend for oil remediation on saline waters, as would be found in oceans and some inland seas, might comprise ammonium sulfate, ammonium polyphosphate, and an iron source such as ferrous sulfate. For oil remediation on fresh water, a typical nutrient supply might comprise ammonium sulfate, ammonium orthophosphate, and/or potassium sulfate. Although not fully established, results of preliminary work indicate that in the salt water application above, the pH thereof, requires the use of the polyphosphate rather than the orthophosphate. Also, in the case of the salt water application, because of the composition involved, such results supra indicate that an iron source, such as iron sulfate, need to be incorporated as an amendment. Although the polyphosphate form and the iron source amendment can be dispensed with, albeit, used if desired, when the environment comprises fresh or perhaps only slightly brackish water, there appears to be a requirement in such fresh water environment wherein supplemental potassium is required, hence the indication above for utilizing, as a convenient source thereof, potassium sulfate.

Referring again to FIG. 1, practice of the third embodiment of the instant invention can be effected by utilizing essentially the same equipment and procedure as in embodiment 1 or 2, supra, except that instead of adding the blowing agent materials as amendments to, with, or subsequent to placement of urea in hopper 2, in most of the practices of this third embodiment not only is the blowing agent not required but the addition of urea to hopper 2 via line 1 is substantially if not totally eliminated, and substituted therefore is the use of line 1 for introduction, from a source not shown, of poultry litter, preferably composted poultry litter along with, if desired, various amending plant nutrients, it being understood, of course, that the iron sulfate upon which the reducing conditions of the composted poultry litter exhibit its desired effects may likewise be introduced with such litter via line 1 to hopper 2 or alternatively as in embodiment 2, supra, by joining with and introducing, from a source not shown, via line 3. Additional nutrients or amendments, which can likewise be introduced preferably to hopper 2, can include cotton seed mill for realizing improved odor control characteristics along with, if desired, supplemental nitrogen containing materials, including urea.

DESCRIPTION OF THE PREFERRED EMBODIMENTS

In determining the operating parameters allowable and desirable for the practice of the present invention for the production of a controlled release fertilizer, it has been found that said method can be operated over a rather wide, but nevertheless critical range of variables. For instance, urea, urea phosphate, ammonium phosphate, potassium chloride, and a variety of commercially prepared blended fertilizers which contain a plethora of fertilizer nutrients have been utilized as fertilizer nutrients. It has been found that urea is the best source for nitrogen due to its ease of extrusion and high nutrient content. When urea is the only fertilizer material dispersed in the matrix, the practice of the instant invention is operable over a range of 10 to 90 percent urea, but preferably over a range of 50 to 80 percent, and is most preferred within a concentration of 75 to 80 percent. Likewise, for matrix materials, polymers which include polyethylene, propylene, and polybutene of various molecular weights and different degrees of branching within the polymer structure have been used. It has now been determined that the matrix materials which are preferred in the practice of the instant invention are linear and nonlinear polyethylene of molecular weights ranging from about 3,000 to about 18,000. Within this operating range, if the molecular weight of the polyethylene is properly selected, it will have only a minimal effect on the final product, but only if the proper proportion thereof is blended with the wax. In this vein and in this range, it has now been discovered that there exists a direct, but inversely proportional relationship, between the molecular weight of the polyethylene and the proportion thereof blended with the wax. For example, potyethylenes of high molecular weight are blended in relatively low proportions with waxes, whereas polyethylenes of low molecular weight are blended in relatively high proportions with waxes. For the matrix wax-polymer blend, it has now been determined that concentrations of polymers from about 8 to 50 percent (2 to 12.5 percent in the final product) and more specifically 25 to 40 percent are preferred. Since polyethylene is soluble in practically all waxes and oils, essentially all waxes and oils including petroleum, animal, and vegetable sources are suitable for use in combination with polyethylene for the wax-polyethylene matrix material. Paraffin wax with a melting point of 110°–165° F. and slack wax (a partially refined wax consisting of about 80 to 90 percent paraffin wax and about 10 to 20 percent paraffin oil) with a melting point of about 100°–155° F. are preferred for formulating the wax-polyethylene matrix blend. In efforts to utilize waste materials whenever possible, a waste wax derived from die cast molding is ideal for use in conjunction with waste polyethylene from wire stripping. This wax is a high grade wax with a melting point of about 150° F. and contains no environmentally hazardous materials. Most of this wax is currently being remanded to landfills for disposal. Considering the increasing cost of landfills, in addition to the negative environmental impact, the use of this wax in the practice of the present invention will serve both industry and agriculture.

The overcoating material may comprise materials from two categories: (1) blends of polymers dissolved or suspended in waxes or oils, with such blends having melting points ranging from about 80° C. to about 130° C., may be heated to their melting point and coated, as by granulating, onto the preformed heterogeneous fertilizer pellets; practice of the present invention with blends of paraffin wax of 50 to 90 percent, polyethylene of 5 to 25 percent, and hydrocarbon resin of 5 to 25 percent have been found to be best suited for the overcoat material; (2) liquids containing polymers may be sprayed onto the preformed heterogeneous fertilizer pellets and the solvent therein evaporated. Such liquids may comprise, for example, aqueous solutions of polyester resin and polyvinyl alcohol, aqueous suspensions of polyethylene resins, hexane solutions of vinyl acetate, and ethyl acetate solutions of polystyrene.

Any of three commonly practiced methods of application can be employed for the overcoat:
1. The overcoat is applied by hot melt coating a bed of heterogeneous particles, said particles previously formed by incorporating a water-soluble material in a matrix of water-insoluble material, is caused to rotate in a drum or pan and said bed is heated to a temperature slightly above the melting point of the overcoating material. The overcoating material is then added to the bed by means of spraying or pouring and the material mixed until an even distribution of the coating material on the fertilizer pellets is achieved. The bed is then cooled to solidify the coating material and a conditioner is normally added to prevent sticking during the cooling period.
2. The overcoat is applied by spraying a solvent polymer onto a moving bed of such heterogeneous fertilizer pellets as, for example, in a drum/granulator. Heat is applied to the bed during spraying sufficient to dry the spray but not to melt the applied polymer.
3. The overcoating material, usually a low melting polymer (<130° C.) or a higher melting polymer dispersed or dissolved in a lower melting wax or oil in such proportion as to result in a material having a melting point below 130° C. but above about 80° C., is sprayed directly onto a cascading or fluidized bed of such heterogeneous pelletized material with the temperature of the bed being controlled to achieve hardening of the polymer or wax-polymer upon contact with the heterogeneous pelletized material.

For a fertilizer with the added property of having flotation characteristics, ammonium carbonate, $(NH_4)_2CO_3$, is added during pellet formation of the heterogeneous material. Subsequent heating thereof decomposes the ammonium carbonate into both (1) ammonia which is absorbed in situ, and (2) carbon dioxide which forms small bubbles in the product and results in attendant expansion of the material. In the practice of the instant invention, the concentration of the ammonium carbonate, in terms of weight percent normally added, is in the range of 0.5 percent to 2 percent, but preferably in the range of 0.7 percent to 1.3 percent, and ideally at 1.0 percent. If it is known ahead of time that the floating fertilizer is to be used for oil spillage on sea water, rather than on fresh water, less expansion of the product is required due to the higher density of the sea water. In this event, 0.5 percent ammonium carbonate is adequate for the expansion of the product. A minimum temperature of 65° C. is critical for the expansion of the pellet.

In the practice of this second principal embodiment of the instant invention, it has been found that the processing temperatures are indeed critical. For example, it has been determined that temperatures below 65° C. are inadequate for the decomposition of the ammonium carbonate and temperatures even slightly above 65° C. result in a product too soft to contain the small bubbles of carbon dioxide produced by decomposition of the ammonium carbonate. Consequently, the processing temperature should be maintained between about 65° C. and about 70° C.

For practice of the third principal embodiment of the instant invention, and in particular in the production of an iron micronutrient containing fertilizer (and/or soil amendment material), wherein said particular micronutrient is maintained for substantial periods of time in a form readily available to the growing plant, it has now been found that poultry litter and more specifically, composted chicken litter is ideally suited to substitute for the more conventional, but significantly more expensive, chelating agent. It has now been found that when ferrous sulfate is combined, as by mixing, with the litter and thereafter pelletized, the aggregate release of the iron therefrom was unexpectedly delayed over substantial periods of time. In addition to an unexpectably long period for release, the iron was protected from oxidation and consequently released in the preferred ferrous state. For a more detailed disclosure of such preference for making the iron available in the ferrous state see U.S. Pat. No. 5,221,313, Mortvedt, et al., Jun. 22, 1993, the disclosures of which are herewith and hereby incorporated herein by this reference thereto. Added benefits derived from the use of the chicken litter, over and above those resulting from the now observed and heretofore unexpectedly chelating characteristics thereof, include gaining from such litter the extra fertilizer values contained therein such as phosphorus, potassium, organic and inorganic nitrogen, but probably the greatest added benefit is derived from the ability to make good use of a heretofore environmentally undesirable waste material. Although it appears that almost any source of iron can be incorporated into the new iron containing fertilizer of the instant invention, the use of iron containing waste products such as those from the steel or galvanizing industry are preferred since these materials, which are currently being disposed of by deep well injection or by landfill after pretreatment, are available at very low (sometime negative) costs and are quite compatible with practice of the instant process.

EXAMPLES

In order that those skilled in the art may better understand how the present invention can be practiced, the following examples are given by way of illustration only and not necessarily by way of limitation.

It should be understood that the Examples herein presented were selected for the purpose of illustrating the new and novel process of the instant new invention when practiced with a variety of matrix-formulated materials in combination with various coatings. Accordingly, in many, but not all of these examples, virgin polymers or waxes were used in order to determine the full range of material feedstock. Accordingly, it should be appreciated that most, if not all of the many waste materials herein referenced could have been substituted for the virgin material.

Example I illustrates the formulation of a matrix material (fertilizer dispersed in wax-polymer sealant). This product, produced from material including a waste polyethylene, had a release profile and release rate typical of currently available materials which are simply not very suitable for use on many crops (soluble fertilizer nutrient is leached at a relatively constant rate from the formulation following a large initial release).

Examples II and III illustrate a modification of the matrix formulated material prepared according to Example I, wherein was added an outer coating. The selection and use of various outer coatings was for purposes of illustrating various methods and means used for the coatings as well as the different release profiles obtained for each.

Example IV illustrates the use of a relatively inexpensive by-product polymer and a production-type facility to produce a controlled release material suitable for commercial scale usage.

Example V illustrates a unique combination of materials and processing used to produce a controlled release fertilizer suitable for use on a commercial scale and which has been modified so that it floats on water.

Example VI illustrates the production of a material primarily from feedstocks comprised of waste or by-product materials and which has the quite unexpected property of controlled release of certain micronutrients incorporated therein, particularly iron in the preferred ferrous state.

Example VII illustrates the clear advantage, in the practice of the instant invention, that wax-polymer mixes have over waxes or polymers alone.

Example VIII illustrates the use of both waste wax and waste polymer for the matrix in controlled release formulations of the type taught herein.

For the purpose of evaluating such products, some or all of the following nutrient leaching tests were performed:

Leaching Test Number 1: Method number 2.074 of the AOAC (Association of Official Analytical Chemist) Official Methods of Analysis, 14th Ed., also called the Katz test, requires that a 3-gram sample of the unground fertilizer be leached with 250 mL of water over a period of 2 hours. The water-insoluble nitrogen (WIN) in the material is expressed as a percent of the total nitrogen. Water-soluble nitrogen is calculated as the difference between the total nitrogen and the water-insoluble nitrogen. Most U.S. States require that a minimum of 15 percent of the nitrogen be present as WIN for the product to be labeled as a slow release fertilizer.

Leaching Test Number 2: The Differential Dissolution Rate or DDR test is a continuing dissolution test first used for the testing of drugs by the pharmaceutical industry. In this test a 10-gram sample is suspended in water for a designated length of time. After the desired time period, the sample is removed from the water and placed into a second container of water. This leaching process is repeated as often as desired and continued for as long as desired. At no time is the concentration of the soluble fertilizer nutrient allowed to exceed 10 percent of its potential solubility in the water extract. The amount of dissolved nutrient is determined in each extracting solution. The comparison of the total dissolved nutrient with leaching time is used to determine the leaching profile of the product.

Leaching Test Number 3: The "rain simulation" test is designed to determine the dissolution rate and dissolution profile of a controlled release material when the material is subjected to alternate wetting and drying. For this test, 20 grams of sample is spread evenly on a sieve with an area of 50 square centimeters. Water is then sprayed onto the sample at a rate of about 5 mL per minute and continued until 50 mL of leachate is collected. The sample is then dried for a minimum of 24 hours and the water leach repeated. The alternate wetting and drying is continued for the duration of the test. Soluble nutrients are determined on both the leachates and the insoluble matter at the end of the test. NOTE: Any references made herein to materials and/or apparatus which are identified by means of trademarks, trade names, etc., are included solely for the convenience of the reader and are not intended as, or to be construed, an endorsement of said materials and/or apparatus.

EXAMPLE I

The results from this example demonstrate that a fertilizer with delayed and controlled nutrient release can be produced simply and relatively inexpensively by use of the system and process herein described. The product produced in this example has a relatively high initial release rate, followed by a substantial linear release rate. One possible use for this type of release profile would be warm-season turf which requires a relatively large amount of starter fertilizer in the early spring then a constant release rate for the remainder of the active growing period.

A 25-gram sample of polyethylene waste material, comprised primarily of linear, low density polyethylene recovered from the recycling of electrical wire, with a softening point of about 180° C., was dissolved in 75 grams of molten slack wax (commercially available mix of about 85% paraffin wax and 15% paraffin oil) with a melting point of about 45° C. The resulting mixture has a rubber-like texture when cooled and softened at about 100° C. The resulting 100-gram mixture of polyethylene and slack wax (at a temperature of about 100° C.) was added to 300 grams of urea which had been ground sufficiently to pass a 20 mesh (U.S. Standard) sieve. The resulting three-component mixture of urea, wax, and polymer was extruded under the following conditions:

Extruder: Brabender twin screw extruder, research model
Temperature: 115° C., all ports Die: ¼ inch Extruder speed: 20 RPM The resulting rods of extruded fertilizer were cooled and broken into approximately ½ inch lengths, a size suitable for direct application or blending with other fertilizer materials. At this point the fertilizer material is minimally acceptable as a control release fertilizer with a water-insoluble nitrogen (Katz Test) of 51 percent.

For the purpose of this example, the product was further processed into a controlled release product with a non-linear release profile. For this additional processing, 90 grams of the extruded, broken material was placed in a rotating drum and heated to about 100° C. while 10 grams of powdered talc was added, thus resulting in 10 percent additional coating of talc. The talc served as an anticaking conditioner as well as an extender/hardener for the wax-polymer mix at the surface of the fertilizer pellet. When a minimum release rate for the product is desired, a water-insoluble and nonbiodegradable material such as talc may be used. If a faster or gradually increasing release rate is desired, a slightly soluble additive such as ureaform or magnesium ammonium phosphate may be used. Leaching results are given below:

| Katz Test: 3% water-soluble nitrogen | | |
|---|---|---|
| DDR Test: | | |
| Time (days) | 3 6 9 12 19 26 33 40 47 54 61 68 | |
| N Released | 29 41 46 50 55 60 63 65 68 70 72 74 | (% of Total) |

Figure 2:
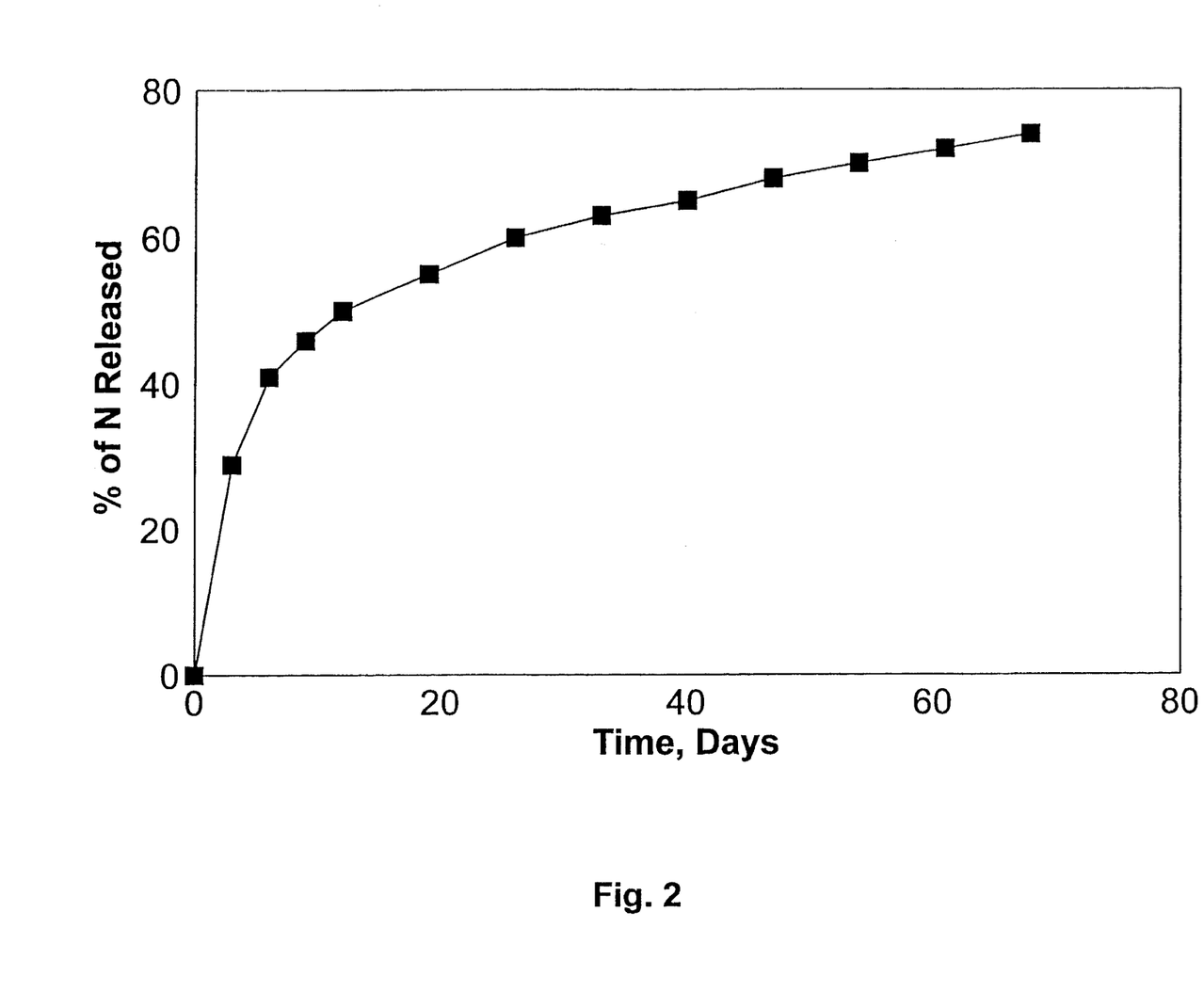
FIG. 2 is a graphical illustration depicting the relationship of the dissolution rate of urea from fertilizer matrix with respect to time for an uncoated, matrix-formulated fertilizer.

The release profile as determined with the DDR test is illustrated in FIG. 2, supra. This release profile is, of course, typical of products currently available and indicates a release of a portion of the nutrients rapidly enough to supply adequate nitrogen (urea), for rapid growth of a crop such as turf, but at a rate which would not cause "burning" (high salt toxicity) to the turf. Following the initial release, the nutrients are released at a sufficient rate to maintain the growth of the turf over an extended period of time.

EXAMPLE II

A portion of the product produced in Example I supra, was further processed to yield a product with a linear, extended nutrient release profile. This type product is ideal for turf grown in areas warm enough for the entire year or in more temperate climates where summer turf is overseeded with cool-season grasses to provide actively growing turf for the entire year.

Figure 3:
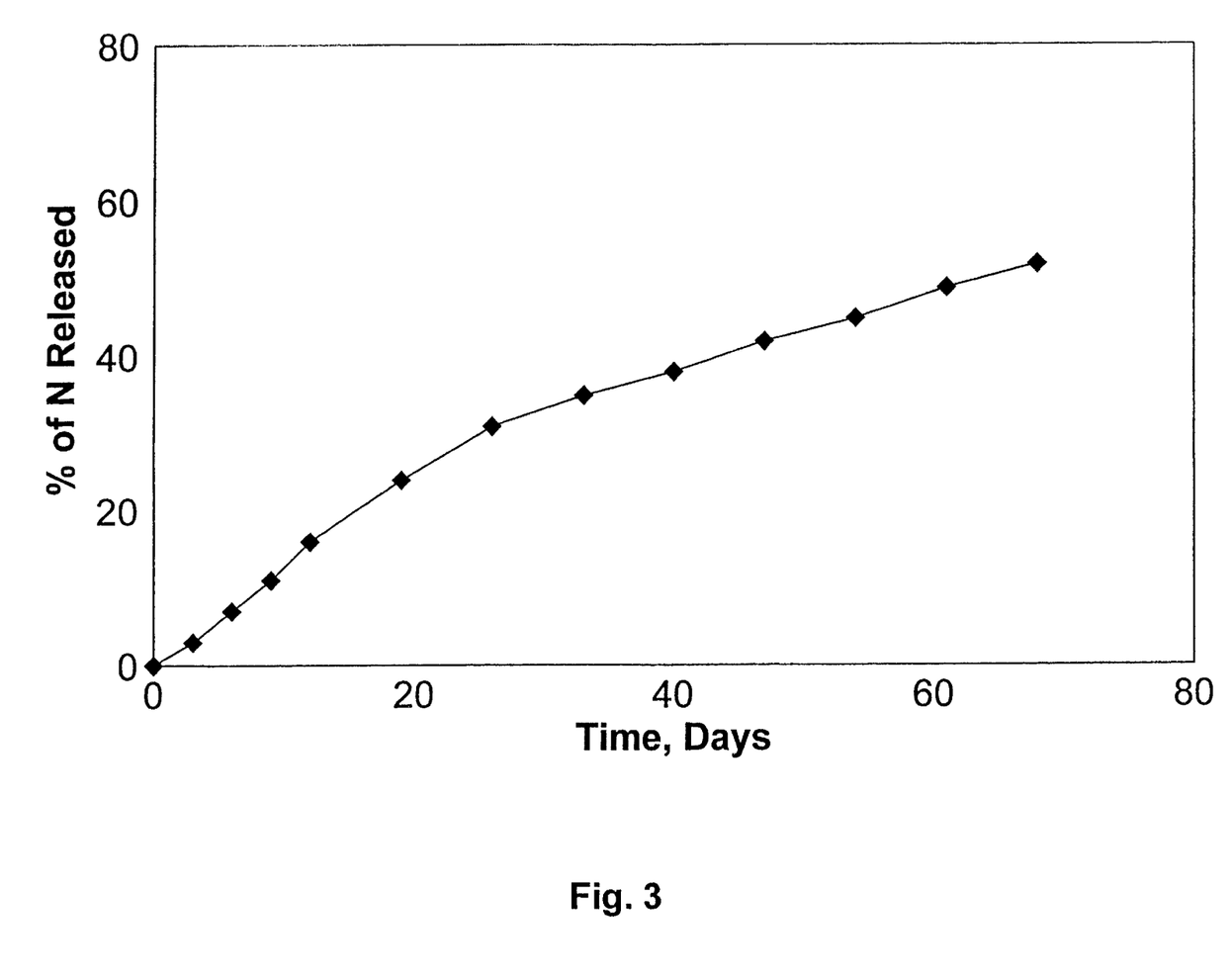
FIG. 3 is a graphical illustration depicting the relationship of the dissolution rate of urea from fertilizer matrix with respect to time for a matrix-formulated fertilizer with an additional wax-polymer coating.
Figure 4:
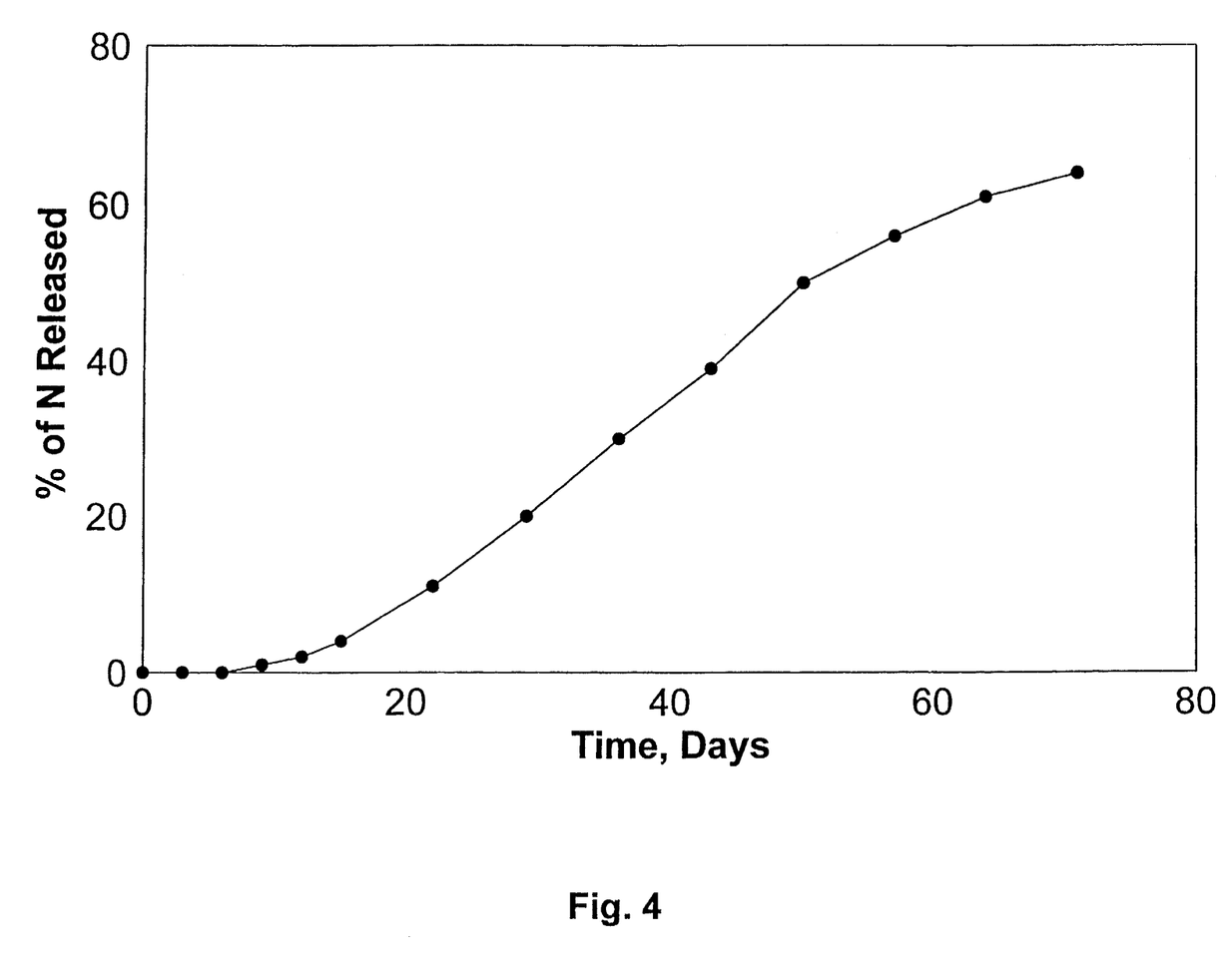
FIG. 4 is a graphical illustration depicting the relationship of the dissolution rate of urea from fertilizer matrix with respect to time for a matrix-formulated fertilizer with an outer coating of wax-polymer in addition to a final coating of a slowly soluble polymer.

Fifty grams of the final product (excluding talc) produced in Example I supra, were removed for purposes of conducting this test and thereafter coated with an additional 8 percent coating by dipping the fertilizer pellets into a molten mix maintained at about 130° C. and comprising generally 80 percent paraffin wax, 10 percent polyethylene (N10, Eastman Chemical Co.) and 10 percent hydrocarbon resin (H100, Eastman Chemical Co.), then allowing the applied coating to cool and harden. The resulting product was of sufficient hardness to be used as a fertilizer or blended with other fertilizers. The solubility of the product in water is indicated below and illustrated in FIG. 3, supra:

| Katz Test: Less than 1% water-soluble nitrogen | |
|---|---|
| DDR Test: | |
| Time (days) | 3 6 9 12 19 26 33 40 47 54 61 68 |
| N Released (% of Total) | 3 7 11 16 24 31 35 38 42 45 49 52 |

The release profile of the product as indicated by the DDR test indicates that the material has a constant release rate over an extended period of time. This release property makes the product ideal for plants which require a continuous supply of nutrients.

EXAMPLE III

Most field crops (corn, cotton, wheat, grain sorghum), as well as most vegetable crops (lettuce, tomatoes, cucumbers) have an uptake profile for nitrogen, wherein in the early stages of growth little or no supplemental nitrogen is required. When the crop reaches the rapid growth stage, a large amount of nitrogen is required. The only significant differences between the uptake profile for nitrogen in the major crops are the length of time from planting to rapid growth stage, and the rate of consumption of nitrogen during this stage. It is desirable for all nitrogen to be released at least 30 days prior to crop maturity to reduce the amount of residual nitrogen in the soil. With the product produced in this example, it is clearly shown that a product can be produced to meet the needs of major agricultural crops. The initial delay of nutrient release is easily controlled by the nature and thickness of the outermost coating. The release rate during the rapid growth stage of the crop is easily controlled by the matrix material (type and concentration).

Rice grown in the Unites States is normally seeded into prepared soil. The rice seedling is allowed to grow for about 30 days then the field "flooded" with water to a depth of about 6 inches. At the time of flooding, essentially all the nitrogen in the soil is volatilized as the type of active soil bacteria changes from predominately aerobic to anaerobic. Accordingly, a fertilizer suited for such rice cultivation would have a low or nil nitrogen release rate for about the first 30 days after application to the soil situs ("starter" fertilizer is economically supplied with water-soluble commercial fertilizers), and then have a release rate wherein the nutrient values therein, including nitrogen, would continuously release at a rather constant rate for about the next 60 days. As may be appreciated from the results of this example, the product produced herein ideally attains these release rates to meet the nutrient needs of such cropping practice.

Twenty-four and one-half grams of the final product produced in Example II, supra, were removed for the purpose of this test and coated with 0.5 grams (dried weight) of a water-dispersed polyethylene, supplied by Eastman Chemical Co., and comprised 25 percent Epolene E-10 polyethylene; 4.5 percent oleic acid; 4.0 percent Morpholine surfactant; and 66.5 percent water. The coating was applied by alternately spraying a portion of the coating material, then drying the coating by tumbling and blowing warm air over the fertilizer bed. The slowly soluble top coating serves as a barrier to water penetration until its dissolution, at which time the fertilizer nutrients are released in a fashion similar to the product of Example II. Dissolution rate tests are given below:

| Katz Test: Less than 1% water-soluble nitrogen | | | | | | | | | | | | | |
|---|---|---|---|---|---|---|---|---|---|---|---|---|---|
| DDR Test: | | | | | | | | | | | | | |
| Time (days) | 3 | 6 | 9 | 12 | 15 | 22 | 29 | 36 | 43 | 50 | 57 | 64 | 71 |
| N Released (% of Total) | 0 | 0 | 1 | 2 | 4 | 11 | 20 | 30 | 39 | 50 | 56 | 61 | 64 |

It is clear from the DDR test that a considerable delay in the release of the nitrogen is realized by the material produced in the conduct of this test. Essentially no nitrogen is released in water for a period of about 12 days. Under field conditions the amount of water in contact with the fertilizer would be considerably less than in the DDR test and would likely result in a longer delay of initial release of the nutrients. These release properties meet the requirements of a product eminently suitable for major crop fertilization. Unlike currently available products, the product produced in this example can be altered during its production to control both the release rate of the fertilizer and the time at which release begins.

Figure 5:
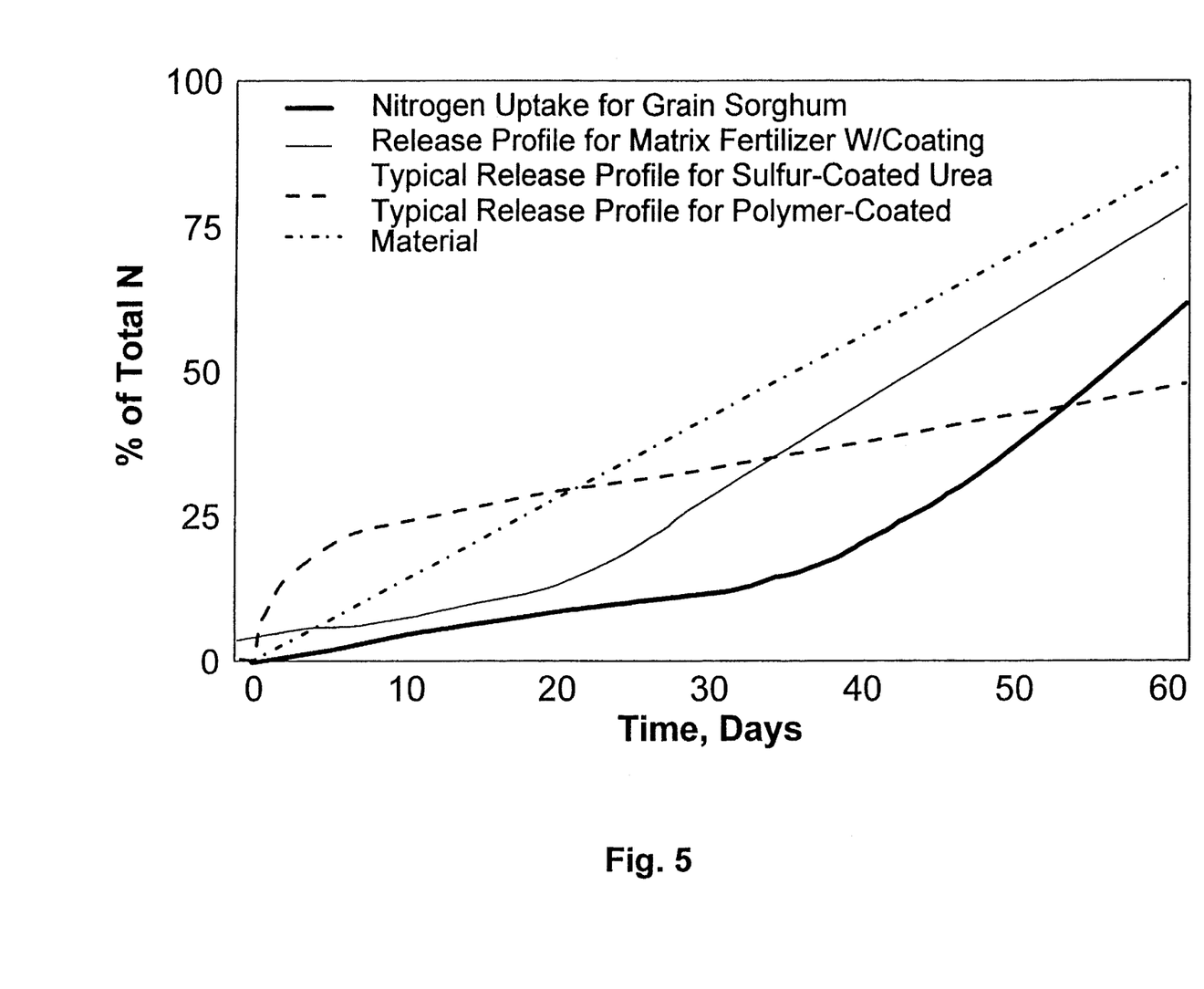
FIG. 5 illustrates the products suitability for a major field crop (grain sorghum). Also illustrated, in side-by-side comparison, are the less than desirable release characteristics of certain sulfur- and polymer-coated materials.

FIG. 5 illustrates the release rate of the nitrogen with respect to time and clearly shows that the release profile for this product closely parallels the release profile for grain sorghum, a major agricultural crop. As with the instant product, it is desirable for the release of the nitrogen from a product to occur 1 to 2 weeks prior to its uptake to allow for mineralization and distribution in the root zone. FIG. 5 also illustrates typical release profiles for sulfur- and polymer-coated urea. As with all coated materials produced by currently practiced commercial methods the release rate (slope) can be controlled but not the time that release begins.

Figure 6:
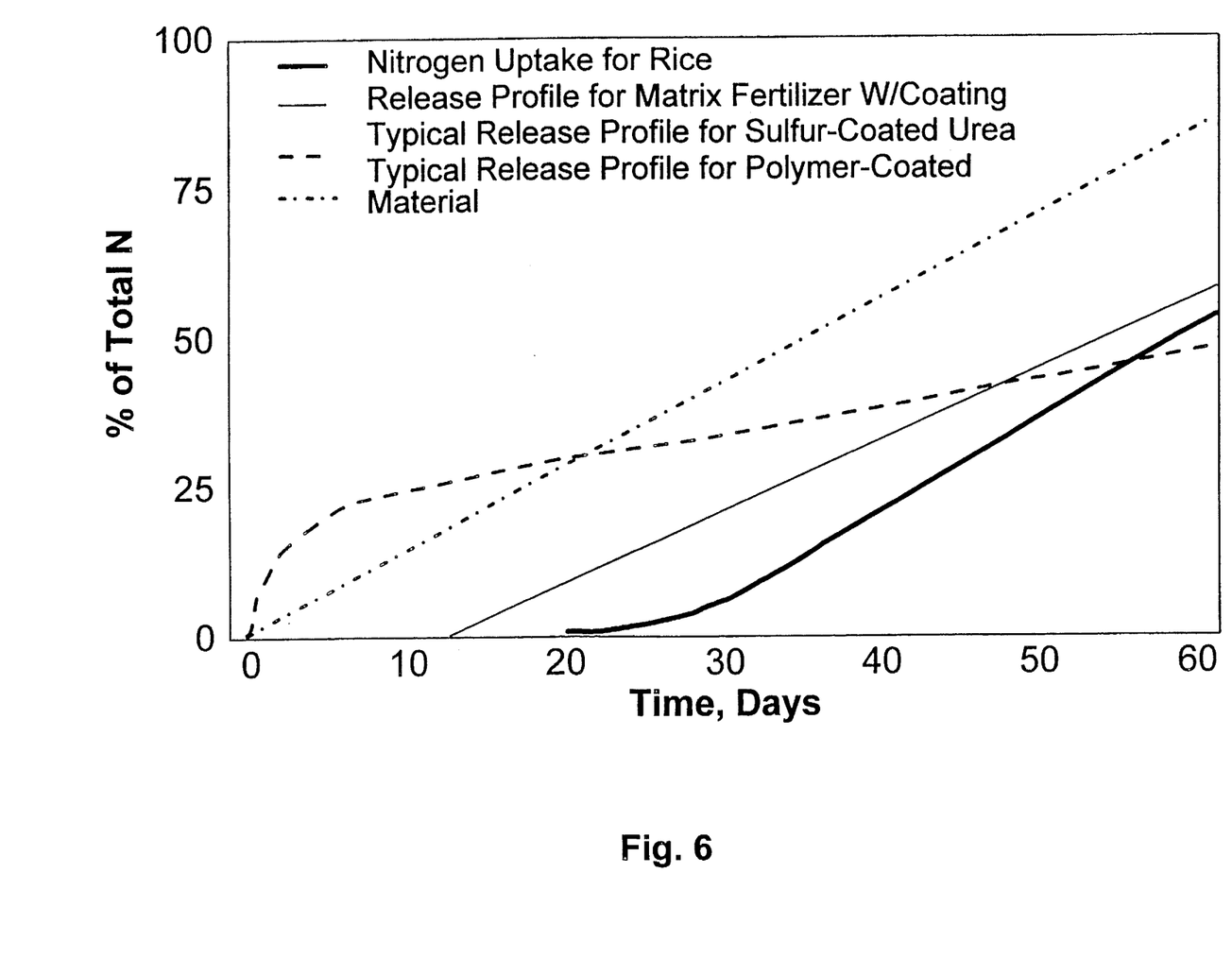
FIG. 6 is a graphical illustration depicting the relationship of the dissolution rate of urea from the fertilizer matrix produced in Example III supra, and illustrates the product's suitability for rice fertilization. Also shown, in side-by-side comparison, are release profiles for polymer and sulfur coated materials wherein it may be seen that such release profiles are not suited for rice fertilization.

FIG. 6 illustrates the product's suitability for mechanical rice cultivation. The product, when blended with 5 percent of readily soluble nitrogen source (starter), has a release profile which parallels that for rice uptake. Again, release profiles for sulfur- and polymer-coated urea are superimposed to illustrate their undesirability for this crop.

EXAMPLE IV

Low cost is of paramount importance to the economic success and general acceptance in the marketplace. Consequently, both feedstock and production cost must be considered during production. In the following example, a waste polyethylene is used as a feedstock in the production of the instant product. In addition, the pelletizing of the final product is performed by a California Pellet Mill. Those skilled in the art of pelletizing are aware that this procedure and equipment utilization offer a viable means of achieving large quantity production of the instant product at relatively low costs.

Some 237.5 grams of waste polyethylene (primarily linear, low density polyethylene from the recycling of electrical wire) with a softening point of about 180° C., and 75 grams of a commercially available polyethylene (N10, Eastman Chemical Co.) with a softening point of about 110° C. was dissolved in molten slack wax (a commercially available mix of about 15 percent paraffin oil and 85 percent paraffin wax). The resulting molten mix of paraffin oil, paraffin wax and polyethylenes was then mixed with 3750 grams of urea which had been previously crushed to pass 16 mesh screen. The mix was cooled, crushed and then pelletized into 3/16 inch by 3/16 pellets in a California Pellet Mill. Subsequently, some 900 grams of the resulting heterogeneous pellets were placed in a rotating drum such that the temperature thereof was raised to about 90° C. after which about 100 grams of powdered talc was added to the bed of pellets being subjected to the normal alternately rising and falling action resulting from operation of an inclined rotating drum of the type typically used in many production facilities, particularly those employed to produce fertilizer materials. The talc serves as an anticaking conditioner as well an extender for the wax-polymer mix at the surface of the pellets. Resulting pellets were sufficiently hard for direct application to the soil, topdressing of established crops, or for blending with other fertilizer materials. Leaching results are given below and illustrated in FIG. 7.

Figure 7:
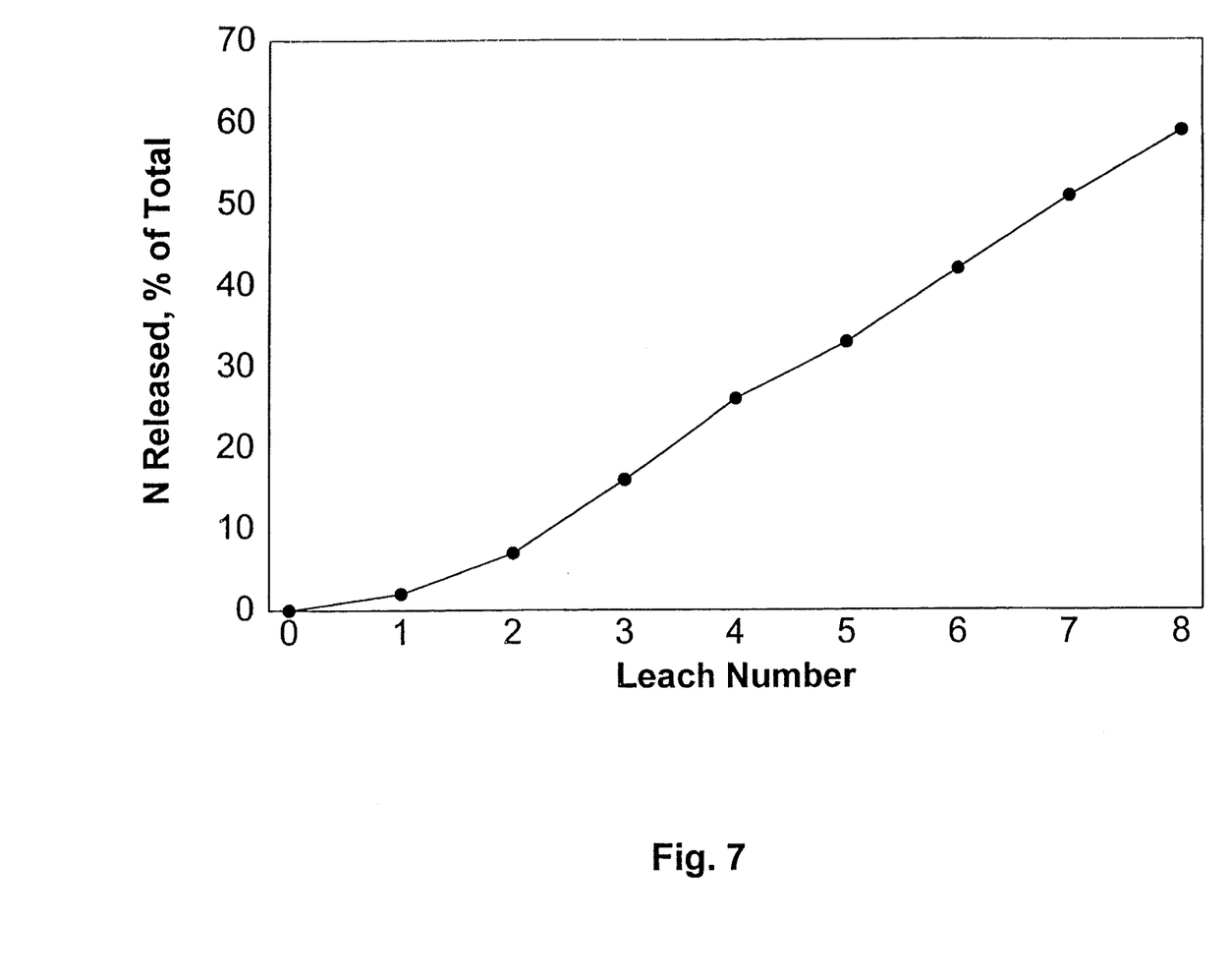
FIG. 7 is a graphical illustration depicting the relationship of the dissolution rate of urea from fertilizer matrix with respect to the number of times leaching has occurred.

| Katz Test: 19% water-soluble nitrogen (% of total nitrogen) | | | | | | | | |
|---|---|---|---|---|---|---|---|---|
| Rain Simulation Test: | | | | | | | | |
| Leach Number | 1 | 2 | 3 | 4 | 5 | 6 | 7 | 8 |
| Nitrogen Released (% of Total N) | 2 | 7 | 16 | 26 | 33 | 42 | 51 | 59 |

EXAMPLE V

In the following example a controlled release fertilizer is produced by the present invention which has an added embellishment, namely, the property of exhibiting flotation. A floating controlled release fertilizer has usefulness in its application to the fertilization of microorganisms which are or may be introduced in juxtaposition with floating oil such as may result from an oil spill. It has been determined that the addition of nutrients, particularly nitrogen, to floating oil aids in the bacterial decomposition of the oil. The application of a floating controlled release fertilizer to oil-contaminated beaches increases the decomposition of the oil in the same manner.

During the production of a floating fertilizer the product is expanded (blown) in the following manner: Just prior to extrusion, ammonium carbonate and urea are added to the fertilizer mix. Upon extrusion, the fertilizer mix is caused to reach a temperature of about 65° C. At this temperature the ammonium carbonate spontaneously decomposes to yield carbon dioxide and gaseous ammonia. The gaseous ammonia is immediately reacted in situ with urea phosphate to form solid ammonium phosphate and urea, both useful fertilizer nutrient sources. The carbon dioxide, also a gas, is caused to disperse in small bubbles into the softened fertilizer material resulting in lower product density necessary for said product to float.

For the production of this product, 35 grams of polyethylene (Epolene N-10, Eastman Chemical Co.) was dissolved in 105 grams of paraffin wax with a melting point of about 65° C. This molten mix was added to a mix comprised of 236 grams of urea and 20 grams of urea phosphate and blended to achieve homogeneity. The mix was then cooled and crushed to a particle size of less than ¼ inch to facilitate its introduction into the extruder. Just prior to extrusion, 4 grams of ammonium carbonate was added and thoroughly mixed therewith. The resulting mix was extruded under the following conditions:

Extruder: Same as in Example I Temperature: Port 1—50° C.; Port 2—55° C.; Port 3—60° C.; Port 4—65° C. Die: ¼ inch Speed: 20 RPM The extruded rods were broken into about ½ inch pellets. These pellets were subjected to an additional coating in the following manner: A 100-gram batch of the pellets was caused to cascade in a rotating drum granulator. A molten mix comprised of paraffin wax (80%), polyethylene, Epolene® N-10, Eastman Chemical Co., (10%) and hydrocarbon resin, Eastotac® H-100, Eastman Chemical Co., (10%) was then sprayed onto the cascading bed until a coating of about 5 percent was achieved. The product was cooled and required no additional treatment prior to use. Evaluation of the product follows:

| Katz Test: Less than 1% water-soluble nitrogen | | | | | | |
| --- | --- | --- | --- | --- | --- | --- |
| DDR Test: | | | | | | |
| Time (days) | 1 | 2 | 3 | 4 | 7 | 10 |
| % Dissolved (of total N) | 10 | 25 | 40 | 52 | 75 | 83 |

A plot of time (in days) versus percent of nitrogen dissolved indicates that the release of the nitrogen is approximately linear over the first 7 days when about 75 percent of this nutrient is released.

EXAMPLE VI

Vegetation grown in certain soils, for example, calcarious soils of the Great Plains, usually suffers from iron deficiency or iron chlorosis. This is due primarily to the fact that the iron contained in the soil is unavailable to the plants. When iron is added to the soil, it too, is bound by the soil so quickly and tightly as to be available for a very short period of time, resulting in a very small portion of the added iron being available for plant usage. In the following example, a fertilizer is produced by practice of the third principal embodiment of the present invention which provides for the controlled release of iron.

It has now been determined that iron from a ferrous sulfate source can acquire slow release properties when dispersed in a certain organic matrix. This dispersed iron is released very slowly from the mix, thus providing a constant supply of iron for plants growing at such situs. In addition, as herein postulated, it appears that the reduced state of the decomposing organic matter helps to prevent oxidation of the ferrous iron to ferric iron, thus, maintaining the iron in the more desirable state.

Thirty-one grams of linear, low polyethylene (waste product derived from wire reclamation process) was dissolved in 94 grams of slack wax (an impure paraffin wax consisting of about 85 percent paraffin wax and 15 percent paraffin oil). This molten mix was added to a mix containing 300 grams of composted chicken litter, 25 grams of cotton seed meal (added for odor control), and 50 grams of iron sulfate/zinc sulfate (by-product from galvanizer industry). The resulting mix was then pressed into 3⁄16 inch pellets on a tablet press. The release rate for the iron in the product (about 2% as Fe) is given below:

| DDR Test: | | | | | |
| --- | --- | --- | --- | --- | --- |
| Time (Days) | 1 | 3 | 7 | 14 | 21 |
| Fe Released (% of Total) | 6 | 8 | 12 | 16 | 19 |

It is clear from the results of this test that the iron in the product (present as soluble iron sulfate) is released continuously and slowly. A release plot of the above is linear; however, if desired or preferred, it can be further modified as in the other embodiments by application of a homogenous overcoat on each heterogeneous particle. Also, if desired, or required, the chicken litter can be utilized to replace all or only some of the nitrogenous constituent, i.e., the urea (in the most preferred embodiment). Accordingly, the chicken litter can supply from about 40 to about 90 percent of the nutrients thereof, or can completely replace all of same to account for 100 percent of the fertilizer material. Likewise, the iron sulfate can range from about 10 to about 30 percent by weight based on the weight of the chicken litter. If more than about 30 percent iron sulfate is used, it appears to dilute or override the effects of the litter material in effectively chelating same.

The period of continued release or effectiveness of the embodiment can be realized for times ranging upwards of several months if the proportion of said litter or iron are maintained as noted, supra. Possibly of far greater importance, is the fact that this product is produced almost entirely from waste materials, which materials are not currently disposed of in an environmentally acceptable manner.

EXAMPLE VII

The results from this example demonstrate that a combination of paraffin wax and polyethylene is superior to either wax or polyethylene alone for use in the formulation of matrix fertilizers of the type herein taught.

For purposes of this test, five samples were prepared by admixing 300 grams of urea with 100 grams of different matrix materials. For each test a different matrix material (sample) was used. Thus, in this test, each of the five samples used had ratios of wax/polyethylene as shown below:

| | Sample | | | | |
| --- | --- | --- | --- | --- | --- |
| | 1 | 2 | 3 | 4 | 5 |
| % wax | 100 | 75 | 50 | 25 | 0 |
| % Polyethylene (Eastman N-10) | 0 | 25 | 50 | 75 | 100 |

For each sample, the matrix material was heated to a temperature about 20 degrees above its softening point. The urea was then added and the resulting product thoroughly mixed. The mix was cooled, crumbled, and pelletized in a pellet press, this being the only machine which would effectively pelletize the samples containing all ratios of wax/polyethylene. Following pelletization, each sample of pellets was then coated with an additional 70 grams (15%) of the same wax/polyethylene material initially used in the particular sample formulation, except for sample 5 which was too soft for continued testing. The release rates for the contained nitrogen are given below:

Results from DDR test:

| % Released: | Sample | | | | |
|---|---|---|---|---|---|
| | 1 | 2 | 3 | 4 | 5 |
| 2 hours | 6.1 | 0.7 | 0.9 | 6.5 | sample too soft for coating and testing |
| 1 day | 85.4 | 22.7 | 13.2 | 45.2 | |
| 2 days | 99.1 | 63.9 | 42.7 | 69.8 | |
| 5 days | 99.9 | 98.3 | 88.2 | 95.5 | |

It is clear that the products produced with wax/polymer mixes, in the ratios recommended for this process, are superior to products formulated with wax or with polyethylene alone.

EXAMPLE VIII

Of paramount importance in the practice of the instant invention, is the provision for utilization of waste materials, particularly in the preparation of the matrix material, to thereby ensure low production costs and to realize the objects of the instant invention as they relate to waste reduction. The following example illustrates the use of waste wax and waste polyethylene.

Twenty-four grams of waste polyethylene (primarily linear, low density polyethylene derived from the recycling of electrical wire) was dissolved in 136 grams of molten wax (waste material derived from investment casting). Two Hundred Forty grams of crushed (−16 mesh) urea was added to the resulting molten polyethylene/wax mix and then blended together. The resulting blend was cooled slightly, crushed, and then extruded into ¼ inch rods. The rods were cooled and broken into ½ inch pellets.

Extruder: Brabender twin screw extruder, research model Temperature: 100° C., all ports Die: ¼ inch Extruder speed: 20 rpm Product analysis: Katz Test: water-soluble nitrogen—25%

A portion of the broken pieces of extruded product was placed in rotating drum and heated to about 60° C., while molten (waste) wax was added to yield an average additional coating of 2 percent.

Product analysis: Katz Test: water-soluble nitrogen—5%

Another portion of pieces of the extruded product was dipped into molten (waste) wax maintained at 115° C. The dipping resulted in an average additional coating of 10 percent.

Product analysis: Katz Test: water-soluble nitrogen—<1%

As may be well appreciated from the results of this and other tests herein reported, such production of a controlled release fertilizer from waste materials and urea results in a relatively inexpensive product while at the same time decreasing the amount of waste material requiring alternate disposal treatment.

INVENTION PARAMETERS

After sifting and winnowing through the data supra, as well as other results of tests and operations of our new, novel, and improved method for the production of matrix-formulated, controlled release fertilizers utilizing waste and by-product materials, we now present the acceptable and preferred parameters and variables as shown below.

For the practice of the first embodiment of the instant process, urea dispersed in a matrix of wax and polyethylene is preferred and the same wax and polyethylene for the overcoat layer is preferred. Although any fertilizer nutrient may be used in the instant process, urea is preferred because of its relatively low cost and high nitrogen content.

All waxes (animal, vegetable, and petroleum) will suffice for the dissolution and dilution of the polyethylene, however, petroleum waxes are preferred primarily due to their relative abundance and low cost. The most preferred waxes include paraffin wax, microcrystalline wax, and slack wax. We have discovered a source of waste wax (primarily paraffin and microcrystalline wax) from investment molding processing. This wax is most preferred due to its low cost.

Any polymer which will dissolve in wax will suffice for the matrix formulation and/or the overcoat. Of the polymers tested, polyethylene, polypropylene, and polybutene are preferred. Polyethylene is the most preferred due to its ease of dissolution in waxes as well as its availability as a low cost waste material.

The ratio of wax to polymer is critical, although variable, depending upon the softening point of the polymer. Since urea is used in most formulations for the first embodiment, the processing temperature must not exceed the melting point of the urea (132° C.). To achieve the proper blend of wax and polymer, first the polymer and wax are selected, then the temperature at which the pelletization is to occur. The wax and polymer are then blended to achieve a mix which is sufficiently soft to be pelletized at the desired temperature (higher wax content will result in a lower softening temperature, higher polymer content will result in higher softening temperature). For the practice of the first embodiment of the instant process it was found that most polyethylenes, polypropylenes, and polybutenes will suffice for the matrix material. Preferred polymers are polyethylenes with molecular weights between about 3,000 to about 18,000. With polyethylenes of this molecular weight range (includes waste polyethylene) the preferred concentration of polyethylene is from about 20 percent to about 30 percent in wax and most preferred at 25 percent polyethylene and 75 percent wax.

For the overcoating material, blends of petroleum wax, polyethylene, hydrocarbon resin, and or polypropylene may be applied by hot bed coating, hot melt spraying or dipping, and spraying of solutions or emulsions of polyethylene, polypropylene, polyester, polystyrene, polyvinyl, polyurethane and/or hydrocarbon resin. For the practice of the instant process, the use of polyethylene/wax mixes is preferred, similar to the matrix mix for products in which linear release profiles are desired. For practice of the instant process the preferred coatings are from about 1 percent to about 10 percent, depending upon the desired release rate of the nutrient and most preferred is a coating of about 5 percent for most products produced for agricultural and turf use. For materials which require an initial delay of nutrients, it has been found that emulsions of polyethylene are preferred and at coating levels of about 1 percent to 5 percent and most preferred at about 3 percent.

For the practice of the second embodiment of the instant process, the selection of wax and polymer was the same as with the first embodiment, except that the processing must be performed at a temperature of 65° C. to 70° C. The nutrients for the floating fertilizer were selected from a wide range of nutrients including urea, ammonium salts, phosphates, and micronutrients. The preferred nutrient will be determined by the intended use of the fertilizer. With the practice of the instant process, essentially all nutrients can be used in desired formulations. Since linear release profiles are usually desirable for floating fertilizers, the preferred (optional) overcoating is of the same composition as the matrix and its level of application determined by the desired release rate of the product but normally preferred in the range of 0 to 10 percent and most preferred at a level of 5 percent.

For the practice of the third embodiment of the instant process, the selection of wax and polymer was the same as with the first embodiment. The temperature range of pelletization is not critical for the third embodiment. Products can be produced from about 30° C. to about 160° C., however, temperatures in the range of about 75° C. to about 105° C. are preferred, with the most preferred being about 90° C. For the ferrous iron source, almost any source of iron can be incorporated into the new iron-containing fertilizer of the instant process. Due to low costs and environmental advantages, utilization of iron-containing waste products, such as those from the steel or galvanizing industry, are preferred and the most preferred is ferrous sulfate from the galvanizing industry.

While we have shown and described particular embodiments of our invention, modifications and variations thereof will occur to those skilled in the art. We wish it to be understood therefore that the appended claims are intended to cover such modifications and variations which are within the true spirit and scope of our invention.

What we claim as new and desire to secure by Letters Patent of the United States is:

1. A slow release fertilizer having improved release profiles of substantially water-soluble constituents therein, said fertilizer comprising:

a plurality of heterogeneous particles with each of said heterogeneous particles comprising a plurality of homogeneous particles of at least one substantially water-soluble, nitrogen-containing constituent set in a matrix of water-insoluble material, said at least one substantially water-soluble constituent selected from the group consisting of urea, urea phosphate, ammonium phosphate, or mixtures thereof, and said water-insoluble material comprising polyethylene, said polyethylene having a molecular weight ranging from about 3,000 to about 18,000 and said polyethylene in combination with from about 50 to about 90 weight percent wax wherein the proportion of said wax, relative to said polyethylene, is directly, but inversely, proportional to the molecular weight of said polyethylene; and a substantially continuous and homogeneous film of a water-insoluble material juxtaposed the surface of and encapsulating each of said heterogeneous particles, said water-insoluble material comprising polyethylene, said polyethylene having a molecular weight ranging from about 3,000 to about 18,000 and said polyethylene in combination with from about 50 to about 90 weight percent wax wherein the proportion of said wax, relative to said polyethylene, is directly, but inversely, proportional to the molecular weight of said polyethylene.

2. The slow release fertilizer of claim 1, wherein said at least one substantially water-soluble, nitrogen-containing constituent set in said matrix of water-insoluble material comprises from about 5 percent to about 30 percent by weight ammonium phosphate, urea phosphate, or both and substantial amounts of the reaction products of:

(a) said ammonium phosphate, urea phosphate, or both; and (b) from about 0.5 percent to about 3 percent, by weight, of ammonium carbonate, said weight of ammonium carbonate based on the weight of the ammonium phosphate or urea phosphate or both in said matrix; whereby is provided a product having a specific gravity ranging from about 0.8 to about 0.95.

3. The slow release fertilizer of claim 1, wherein a material comprising a substantial proportion of composted poultry litter and a minor proportion of iron sulfate is substituted for a portion of said substantially water-soluble constituent.

4. The system of claim 3, wherein the portion of the substituted material ranges from about 40 percent to about 99 percent, by weight, of said substantially water-soluble constituent and the proportion of said iron sulfate relative to said litter therein ranges from about 10 to about 30 percent, by weight.

5. The slow release fertilizer of claim 1, wherein a material comprising a major proportion of composted poultry litter and a minor proportion of iron sulfate is substituted for said substantially water-soluble constituents.

6. The slow release fertilizer of claim 5, wherein the proportion of said iron sulfate relative to said composted poultry litter ranges from about 10 percent to about 30 percent, by weight.

7. A slow release fertilizer having improved release profiles of substantially water-soluble constituents therein said substantially water-soluble constituents containing iron sulfate or iron chloride or both, said fertilizer comprising:

a plurality of heterogeneous particles with each of said heterogeneous particles comprising a plurality of particles of composted poultry litter in combination with said substantially water-soluble constituents containing iron sulfate or iron chloride or both, and set in a matrix of water-insoluble material comprising polyethylene, said polyethylene having a molecular weight ranging from about 3,000 to about 18,000 and said polyethylene in combination with from about 50 to about 90 weight percent wax and wherein the proportion of said wax, relative to said polyethylene, is directly, but inversely, proportional to the molecular weight of said polyethylene.

8. A slow release fertilizer having improved release profiles of substantially water-soluble constituents therein said substantially water-soluble constituents containing iron sulfate or iron chloride or both, said fertilizer comprising:

a plurality of heterogeneous particles with each of said heterogeneous particles comprising composted poultry litter in combination with said substantially water-soluble constituents containing iron sulfate or iron chloride or both, and said heterogeneous particles set in a matrix of water-insoluble material comprising polyethylene, said polyethylene having a molecular weight ranging from about 3,000 to about 18,000 and said polyethylene in combination with from about 50 to about 90 weight percent wax wherein the proportion of said wax, relative to said polyethylene, is directly, but inversely, proportional to the molecular weight of said polyethylene; and a substantially continuous and homogeneous film of a water-insoluble material comprising polyethylene juxtaposed the surface of and encapsulating each of said heterogeneous particles, said polyethylene having a molecular weight ranging from about 3,000 to about 18,000 and said polyethylene in combination with from about 50 to about 90 weight percent wax wherein the proportion of said wax, relative to said polyethylene, is directly, but inversely, proportional to the molecular weight of said polyethylene.

* * * * *